3,447,653
CONTROL WHEELS FOR USE WITH ROLLER
CONVEYORS
Percy E. Watts, Hagley, and Brian M. Colleran, South
Harrow, England, assignors to Link 51 Limited, Birmingham, England, a British company
Filed Sept. 20, 1967, Ser. No. 669,242
Claims priority, application Great Britain, Sept. 24, 1966, 42,739/66
Int. Cl. B65g *13/00*
U.S. Cl. 193—35    2 Claims

ABSTRACT OF THE DISCLOSURE

A control wheel having within it an escapement mechanism between relatively rotatable rim and hub parts to restrain the relative rotation thereof.

---

It is an object of the present invention to provide a control wheel which is inexpensive to manufacture and operates consistently under different operating conditions.

According to the present invention a control wheel is provided comprising a hub part, a rim part rotatably supported by bearings on the hub part, and restraining means including an escapement wheel driven by the rim part and an oscillatable pallet member co-operable with and oscillated by the escapement wheel and said restraining means connecting said two parts to resist relative rotation thereof wherein the improvement comprises an annular chamber formed by the hub part and the rim part and in which annular chamber the restraining means is enclosed.

A control wheel constructed in accordance with the present invention will now be more particularly described, by way of example, with reference to the accompanying drawings in which.

Figure 1:
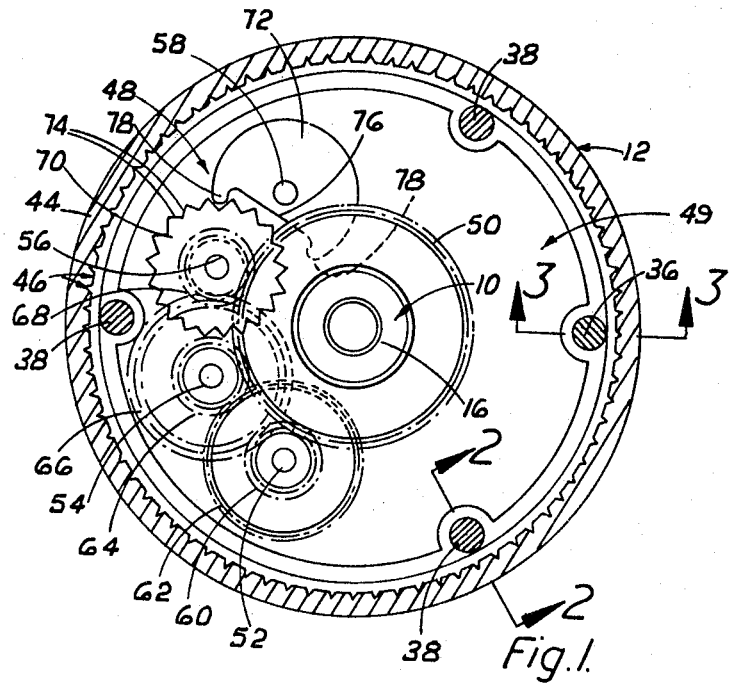
FIGURE 1 is a side view of a control wheel, looking in the direction of the arrow A, FIGURE 3, from which a part thereof has been removed to expose the interior of the control wheel.
Figure 2:
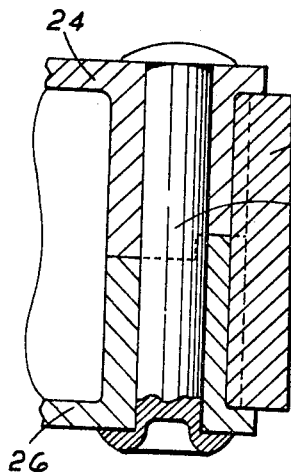
FIGURE 2 is a sectional view of FIGURE 1 on the line 2—2 thereof and on an enlarged scale.
Figure 3:
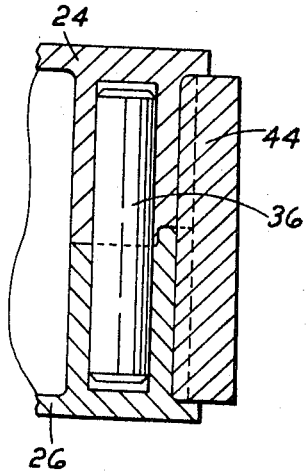
FIGURE 3 is a sectional view of FIGURE 1 on the line 3—3 thereof and on an enlarged scale.
Figure 4:
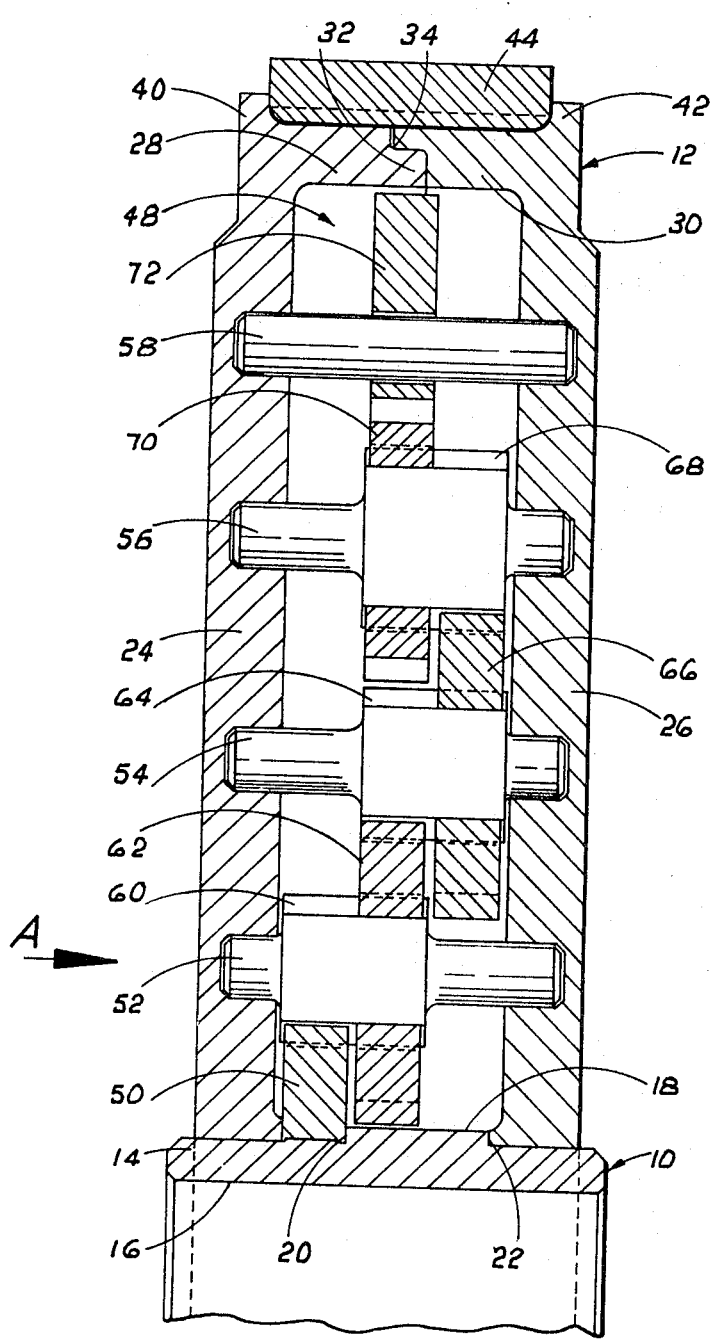
FIGURE 4 is a developed sectional view of FIGURE 1 on an enlarged scale to show the restraining means more clearly.

The control wheel comprises in main two relatively rotatable parts, there being a hub or axle part 10, which is usually supported in a stationary i.e. non-rotatable, manner and a rim part 12 which rotates relatively to the hub part and which rim part is adapted to be engaged on its periphery by an article such as a pallet herein referred to as a platform.

The hub part 10 comprises a tubular shaft 14, the bore 16 of which can receive a supporting axle (not shown), whereby the control wheel can be mounted in a track of an inclined roller conveyer and in effect one of the rollers of said conveyer.

Formed on the exterior of the tubular shaft is a cylindrical collar 18 affording opposite end abutment faces 23, 22 and rotatable mounted on the opposite bearing ends of the tubular shaft, in an anti-frictional manner, is the rim part which abuts the abutment faces 20 and 22, whereby the tubular shaft and the rim part are relatively axially located. If desired, anti-frictional bearings (not shown) may be arranged between the tubular shaft and the rim part.

The rim part 12 comprises two annular side walls 24, 26 which are spaced apart axially along the tubular shaft 14 by the collar 18 and the circumferential edges of the two side walls are formed on their inner sides with complementary annular flanges 28 and 30 respectively, which together form a rim proper. The opposite inner ends of the flanges 28 and 30 are formed respectively with an annular spigot 32 and an annular socket 34 which interengage, whereby the circumferential edges are spaced apart and relatively located diametrically. The two side walls 24 and 26 are keyed together by a dowel peg 36 to prevent relative rotation of said side walls which are secured together by three rivets 38.

The two side walls are formed with outwardly extending annular flanges 40 and 42 and extend transversely beyond the flanges 28 and 30 so that an annular channel is formed by the flanges 28, 30, 40 and 42 and in the channel is located a rubber tyre 44 which rotates with the rim part and on which tyre the platform, is adapted to be supported as the platform moves across the roller to rotate the rim part of the control wheel. In order to prevent slip occurring between the rubber tyre and the rim part the bore of the tyre and the outer surfaces of the flanges 28 and 30 are formed with interengaging teeth 46.

The hub and rim parts 10 and 12 respectively are coupled together by restraining means generally indicated at 48 disposed within an annular chamber 49 defined between the tubular shaft 14 and the two side walls 24 and 26 and rim proper formed by the flanges 28 and 30, so that the restraining means is completely enclosed and protected from foreign matter when the control wheel is in use.

The restraining means 48 comprises a gear train which steps-up the rotational, i.e. the annular, speed of the rim part and also incorporates an escapement which the gear train drives whereby rotation of the rim part is resisted. The gear train comprises a stationary gear wheel 50 secured to the tubular shaft 14 and this gear wheel may conveniently have fifty-five teeth. Rotatably supported by the two side walls 24 and 26 and extending therebetween are four spindles 52, 54, 56 and 58, the axes of which are parallel with the axis of the tubular shaft 14 and thus of the axis of rotation of the control wheel and said four spindles are disposed at the same distance from the centre of the tubular shaft so as to lie on a common arc of which the centre is the centre of the tubular shaft.

Secured to or formed on the spindle 52 is a toothed pinion 60 which meshes with the gear wheel 50 aforesaid and said toothed pinion 60 have sixteen teeth and also secured to or formed on the spindle 52 is a gear wheel 62 having thirty-six teeth which meshes with a pinion 64 having sixteen teeth, secured to the spindle 54 on which is also secured or formed a gear wheel 66 having thirty-six teeth which meshes with a pinion 68 having twenty teeth and secured to or formed on the spindle 56. Secured to the spindle 56 is a toothed escapement wheel 70 of the escapement and which co-operates with an oscillatable pallet member 72 secured to the spindle 58. The toothed escapement wheel 70 is formed in its peripheral edge with twenty V-shaped teeth 74 of which the included angle is approximately 90° and each tooth is symmetrical about a radial axis of the wheel and the oscillatable pallet member 72 comprises a part-circular disc which is cut-away at 76 and formed at opposite ends of the cut-away 76, and integral with the disc, are two pallet detents 78 which are each of part-cylindrical formation and the axes of which are disposed parallel to the axis of the spindle 58 and said pallet detents 78 co-operate with the V-shaped teeth 74 to afford an escapement which allows the escapement wheel 70 to rotate against restraint imposed by the escapement action and during which the pallet member is oscillated about the axis of the spindle 52 by the engagement of the teeth 74 and the pallet detents 78.

The control wheel is intended to carry platform loads within the range of approximately 70 lbs. to 350 lbs. and the peripheral speed at which the control wheel is permitted to rotate by the escapement varies between approximately four inches per second to 6½ inches per second in proportion to the load imposed on the control wheel. In order to control the speed of loads heavier than those intended to be carried by a single control wheel, a plurality of control wheels will be provided disposed in close together relation so that the speed at which the platform moves along the conveyor is restricted to the required speed of approximately 4 inches per second to 6½ inches per second.

The various parts of the control wheel described above may, with the exception of the rubber tyre 44, be made of metal or plastics material.

What we claim then is:

1. A control wheel comprising a hub part (10), a rim part (12) rotatably supported by bearings on said hub part, restraining means (48) including an escapement wheel (70) driven by said rim part and an oscillatable pallet member (72) co-operable with and oscillated by said escapement wheel, said restraining means connecting said two parts to resist relative rotation thereof, wherein the improvement comprises an annular chamber (49) formed by said hub part and said rim part and in which annular chamber said restraining means is enclosed.

2. A control wheel comprising a hub part (10), a rim part (12) rotatably supported by bearings on said hub part, restraining means (48) including an escapement wheel (70) driven by said rim part and an oscillatable pallet member (72) co-operable with and oscillated by said escapement wheel, said restraining means connecting said two parts to resist relative rotation thereof, wherein the improvement comprises a pair of side walls (24, 26), said restraining means being disposed between said side walls, a step-up gear train (50, 60, 62, 64, 66 and 68) disposed between said hub part (10) and said escapement wheel (70) of an escapement (70, 72), said gear train being supported by spindles (52, 54 and 56), said spindles supported by said side walls, said oscillable pallet member (72) being supported by a further spindle (58), also supported by said side walls, and the axis of said sindles being parallel with the axis of rotation of said control wheel.

References Cited

UNITED STATES PATENTS

| | | | |
|---|---|---|---|
| 2,618,370 | 11/1952 | Orwin | 193—35 |
| 3,376,965 | 4/1968 | Tregoning et al. | 193—35 |

ANDRES H. NIELSEN, *Primary Examiner.*

U.S. Cl. X.R.

74—1.5